United States Patent [19]

Marchegiano

[11] Patent Number: 4,623,221

[45] Date of Patent: Nov. 18, 1986

[54] DEVICE FOR PROVIDING A SUBSTANTIALLY FLAT LIGHT FIELD

[75] Inventor: Joseph E. Marchegiano, Wilmington, Del.

[73] Assignee: RCA Corporation, Princeton, N.J.

[21] Appl. No.: 701,629

[22] Filed: Feb. 14, 1985

[51] Int. Cl.$^4$ .............................................. G02F 1/00
[52] U.S. Cl. ...................................... 350/321; 362/31
[58] Field of Search ............... 350/169, 170, 173, 174, 350/613, 642, 321, 412, 429, 444, 1.6, 1.7; 362/26, 31

[56] References Cited

U.S. PATENT DOCUMENTS

| | | | |
|---|---|---|---|
| 2,485,345 | 10/1949 | Ackerman | 350/444 |
| 3,001,446 | 9/1961 | Bouwers et al. | 350/444 |
| 3,059,113 | 10/1962 | McHenry | 350/444 |
| 3,476,462 | 11/1969 | Benford | 350/177 |
| 3,491,245 | 1/1970 | Hardesty | 362/26 |
| 3,602,573 | 8/1971 | Kermode | 350/170 |
| 3,715,486 | 2/1973 | Wright et al. | 178/7.2 |
| 3,974,376 | 8/1976 | van der Sande | 350/444 |
| 4,059,916 | 11/1977 | Tachihara et al. | 362/31 |
| 4,161,756 | 7/1979 | Thomas | 350/429 |
| 4,306,762 | 12/1981 | Yamashita et al. | 350/1.6 |
| 4,422,722 | 12/1983 | Higuchi et al. | 350/173 |

OTHER PUBLICATIONS

Fundamentals of Optical Engineering by Donald H. Jacobs, McGraw-Hill Book Co., Inc., 1943, pp. 140–141.

*Primary Examiner*—John K. Corbin
*Assistant Examiner*—Loha Ben
*Attorney, Agent, or Firm*—E. M. Whitacre; D. H. Irlbeck; L. L. Hallacher

[57] ABSTRACT

A device for providing a substantially flat light field to a light imaging medium includes a transparent disc and an optical system. The surface of the disc is made opaque and light is coupled to the optical system through the edge of the disc by reflection from the internal surface of the disc. The intensity of light passing through the disc to the optical system decreases as the distance from the coupling edge increases. The combined effects of the disc and the optical system result in a substantially flat light field.

9 Claims, 8 Drawing Figures

DEVICE FOR PROVIDING A SUBSTANTIALLY FLAT LIGHT FIELD

BACKGROUND

This invention relates generally to optical devices and particularly to a device for providing a substantially flat light field to a light imaging medium.

Many types of measuring and testing equipment require the recording of a light image on a light imaging medium. Frequently the recording medium is a CCD (charge coupled device), or a photo-diode array. In these types of solid state recording devices the individual sensing cells, or pixels, of the device are charged to various levels in proportion to the intensity of the impinging light. Typically, when making inspections, or tests, using a light imaging medium, a light image of the object being inspected is provided to an optical system including a focusing mechanism and a variable aperture. The optical system typically is a high quality commercially available camera. When a solid state recording device is used the film normally used in the camera is replaced by the solid state device. The pixels of the solid state device are charged to different levels proportional to the intensity of the impinging light. Accordingly, the pixel charge levels are an accurate electrical analog representation of the light image received from the object.

An inspection system utilizing a solid state imaging device is described in U.S. Pat. No. 4,454,545. The system described in this patent utilizes a camera having a CCD as the image recording medium. The charge levels on the various pixels are digitized and transferred to a storage mechanism where the digitized data are available for subsequent tests or measurements.

Many systems utilizing the projection of light images onto recording mediums for inspection or measuring are satisfactory for the purposes intended. However, because the operation of systems using solid state devices is dependent upon the response of the individual pixels, the devices must be calibrated prior to any actual use of the system. Typically, the solid state device is calibrated by exposing the device to a known intensity of light and detecting the individual pixel charge levels. Accordingly, it is preferable to uniformly illuminate all pixels of the device. One method of ensuring such uniform illumination entails the use of a commercially available flat field light box as the light source. Such light field boxes provide a light field which is significantly flatter than that of a standard light source. However, these boxes are not ideal because the light field cannot be adjusted or tailored to the system. Another difficulty arises because the light provided by the flat field light box is imaged onto the recording medium through an optical lensing system. As is known to those skilled in the art, the intensity of light passing through an optical system is significantly higher at the center of the focusing lens than at the periphery of the lens. For this reason the recording medium is not uniformly illuminated even when a flat field light box is used as the light source. Accordingly, the accurate calibration of solid state devices is extremely difficult and the useful range of such devices is restricted by the lack of a device for providing a substantially flat light field.

For these reasons there is a need for a device which provides a substantially flat light field to a recording medium and which permits adjustment and tailoring to the system employing the field to optimize the system. The present invention fulfills this long-felt need.

SUMMARY

A device for providing a substantially flat light field includes an optical system and a light field flattener. The light field flattener includes a light transparent element having a light transparent edge arranged to transmit light to the optical system. An opaque means is coextensive with the light transparent element whereby light is prevented from passing directly through the light transparent element to the optical system. Light is coupled to the optical system through the light transparent edge whereby the light passing through the element decreases as the distance, along the surface of the element, from the edge increases.

DETAILED DESCRIPTION

Figure 1:
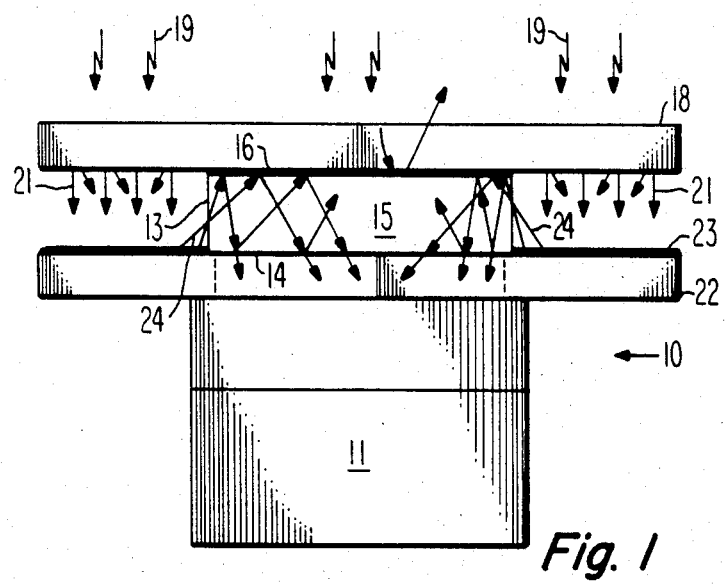
FIG. 1 is a preferred embodiment.

In FIG. 1, the device 10 for providing a substantially flat light field includes an optical system 11. The optical system 11 preferrably is commercially available camera which has been modified to utilize a solid state light recording medium, such as a CCD sensor or a photodiode sensor. Accordingly the optical system 11 has a variable focal length and an adjustable aperture.

Figure 8:
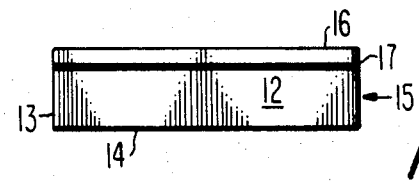
FIG. 8 shows the light field flattener in more detail.

A light field flattener 15 is arranged coaxial with the optical system 11. In FIG. 8, the light field flattener 15 includes a first disc, such as a light transparent element 12 having a light transparent edge 13 and an exit surface 14. The edge 13 is highly polished to maximize the light which enters the element 12. Light exits the element 12 from the exit surface 14. The surface of the element 12 opposite from the exit surface 14 is highly reflective to reflect light through the element to the exit surface 14. An opaque means 16 is coextensive with the reflective surface and prevents light from directly entering the light transparent element 12. The opaque means can be an opaque coating, such as copper, which is permanently affixed to the reflective surface of the element 12. A highly reflective layer 17 is arranged between the opaque coating 16 and the reflective surface of the light transparent element 12. The reflective coating 17 can be any highly reflective material which will adhere to both the light transparent element 12 and the opaque material 16 and, thus, can be, for example, a coat of white paint.

Alternatively, the opaque coating 16 can be a light opaque material having a highly reflective surface permanently adhered to the reflective surface of the light transparent element 12. The reflective coating 17 can be eliminated when this type of opaque material is used. The exit surface 14 of the light transparent element 12 can be roughened to slightly enhance the exit of light.

In FIG. 1, a second transparent disc 18 is affixed to the opaque coating 16 so that the discs 12 and 18 are coaxial. The disc 18 has a diameter greater than that of the element 12 whereby the periphery of the disc 18 overhangs the element 12. The disc 18 receives light rays, demonstrated by the arrows 19, from a standard commercially available light source (not shown). A large percentage of the incident light rays 19 pass through the overhang portion of the disc 18 which is not obstructed by the opaque layer 16. The light rays exit from the bottom surface of the disc 18, as demonstrated by the arrows 21. An annular ring 22 is arranged between the exit surface 14 of the light transparent element 12 and the optical system 11. The light transparent element 12, and the optical system 11 are coaxial. The surface 23 of the annular ring 22 which faces the disc 18 is made highly reflective, such as by a coating of white paint, or by highly polishing the surface. Accordingly, the light rays 21 exiting from the disc 18 are reflected from the surface 23 into the polished edge 13 of the disc 12, as illustrated by the arrows 24. The light rays 24 entering element 12 through the polished edge 13 are reflected by the reflective surface of the disc 12 and, thus, are directed toward the exit surface 14 to exit into the optical system. Because the light rays 19 are coupled to the optical system 11 through the edge 13 and are reflected back-and-forth within the element 12, the intensity of light which exits from the element 12 substantially decreases as the center of the element is approached.

Figure 2:
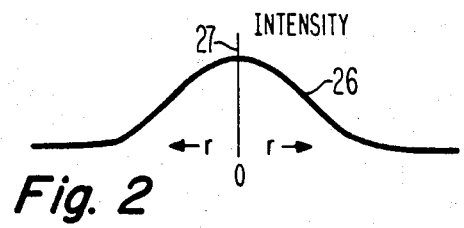
FIG. 2 shows the light intensity pattern of a standard optical system.

FIG. 2 shows the intensity pattern 26 of a typical optical system, such as those utilized in commercially available cameras, for example. The intensity pattern 26 drops off dramatically as the distance r from the center 27 of the lensing system increases. Accordingly, even when the illuminating light is provided by a flat field light box, the pixels of a solid state sensor receiving light from the center of the lens would be charged to a substantially higher level than those receiving light from the periphery of the lens. For this reason, the calibration of a solid state sensor is extremely difficult, even with the assistance of a commercially available flat field light box.

Figure 3:
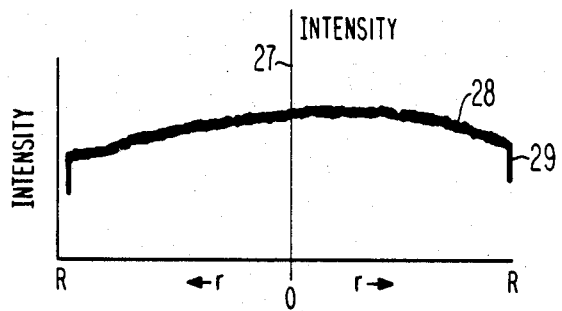
FIG. 3 shows the light intensity pattern of a commerically available flat field light box.

FIG. 3 shows the light intensity pattern 28 which illuminates the solid state detector when the illuminating light is provided by a flat field light box. The intensity pattern 28 is substantially flatter than the pattern 26 of FIG. 2. However, the intensity is significantly higher at the center 27 than at the periphery 29. Accordingly, the calibration of a solid state device illuminated by a light field having the configuration of the pattern 28 is difficult and the full sensitivity of the solid state device cannot be utilized.

Figure 4:
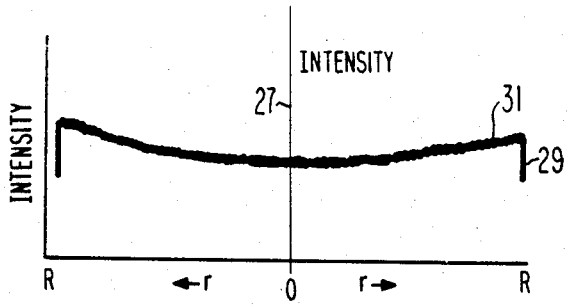
FIG. 4 shows the light intensity pattern of the light transparent element of the preferred embodiment of FIG. 1 when used in conjunction with an unoptimized lensing system and a standard light source.

FIG. 4 shows the light intensity pattern 31, realized when the light field flattener 10 of FIG. 1 is utilized in conjunction with a standard light source, and the aperture of the optical sytem 11 is not adjusted for optimum operation. The intensity increases as the distance r from the center 27 increases. The FIG. 4 pattern 31 suffers the same disadvantages as the pattern 28 of FIG. 3. Accordingly, the full sensitivity of the sensor cannot be utilized.

Figure 5:
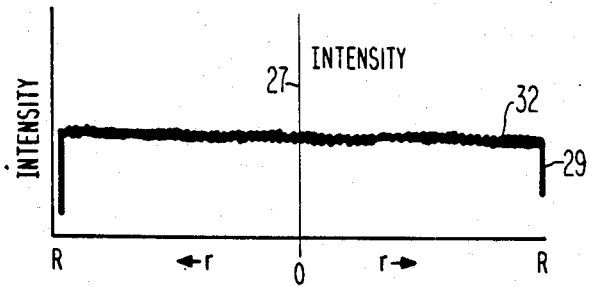
FIG. 5 shows the light intensity pattern of the preferred embodiment of FIG. 1 when the lensing system is optimized and a standard light source is used.

FIG. 5 shows the intensity pattern 32 realized when the light field flattener 10 of FIG. 1 is used in conjunction with a standard light source and the aperture of the optical system 11 is adjusted for optimum results. The intensity remains substantially constant as the distance r from the center 27 of the system increases. Accordingly, all the pixels of the imaging device receive substantially the same intensity of light and the full sensitivity of the imaging device can be utilized. Also, the calibration of the detection device is made simple and accurate by the substantially uniform illumination across the surface of the detection device.

Light enters the disc 12 through the edge 13 and is reflected back-and-forth between the surfaces of the disc until it finally either exits from the exit surface 14 or is absorbed in the disc. Accordingly, light exiting the disc 12 at any point r (FIG. 6) on the exit surface 14 can have entered the disc at any point on the edge 13 of the disc. The light $I_{(r)}$ exiting from any point r therefore is defined as:

$$I_{(r)} = 2\rho(R) \int_{R-r}^{R+r} \left( \phi_{(r=R)} - \int_0^l \rho_{(T)}\phi_{(r)}dr \right) dl \quad (1)$$

$\phi$ = light inside disc 15

Figure 6:
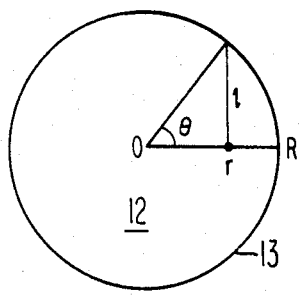
FIG. 6 is a representation of the light transparent element of the preferred embodiment and is useful in understanding how the light intensity output of the device varies along the diameter of the device.

$\rho_{(T)}$ = propagation losses of the disc = $\rho_{(R)} + \rho_{(S)} + \rho_{(A)}$ $\rho_{(R)}$ = percentage of light radiating from the disc per linear cm $\rho_{(S)}$ = percentage of light unfavorably scattered per linear cm $\rho_{(A)}$ = percentage of light absorbed by the disc per linear cm $l = (R^2 + r^2 - 2Rr\cos\theta)^{\frac{1}{2}}$ where: l, R, r and $\theta$ are shown in FIG. 6.

Solving Eq. (1) yields:

$$I_{(r)} = 2\rho(R) \int_0^\pi \phi_0 d\theta - 2\rho_{(R)}\phi_{(r)}\rho_{(T)} \int_0^\pi (R^2 + r^2 - 2Rr\cos\theta)^{\frac{1}{2}} d\theta \quad (2)$$

$\Phi_0$ = light entering the disc 12 at any point on the edge 13.

Eq. (2) can be solved to yield:

$$I_{(r)} = \frac{2\pi\rho_{(R)}\phi_o}{1 + 2\rho_{(T)}W} \quad (3)$$

$$W = \int_0^\pi (R^2 + r^2 - 2Rr\cos\theta)^{\frac{1}{2}} d\theta$$

A low order approximation of Eq. (3) yields $$I_{(r)} \approx \frac{\rho_{(R)}\Phi_{(r=R)}}{1 + \rho_{(T)}(R-r)} + \frac{\rho_{(R)}\Phi_{(r=-R)}}{1 + \rho(R+r)} \quad (4)$$

Figure 7:
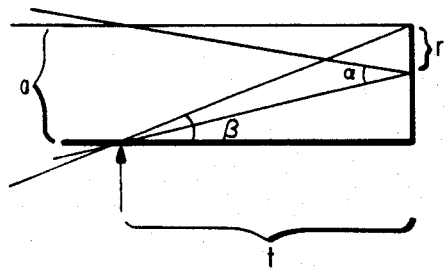
FIG. 7 is useful in understanding how the aperture dimension a and focal length t of the lensing system effect the intensity of light output of the light field pattern at any point on the surface of the element.

FIG. 7 is useful in understanding how the image brightness of a typical lensing system is effected by the line aperture (a) and focal length (t) of the lensing system.

In FIG. 7, r is the projection of the line from the center 0 to the point r of FIG. 6 onto the The image brightness $E_{(r)}$ at any point r on the sensor is proportional to the angle $\beta$:

$$E_{(r)} = I_r A \cos^4 \beta \qquad (5)$$

where:

$$\beta = \tan^{-1}\left(\frac{|r| ta/2}{t}\right),$$

and $A = \sin^2 \alpha$ and $$\alpha = \tan^{-1}\frac{a/2}{t}$$

Equations 4 and 5 show the relationship of image brightness $E_{(r)}$ at any point r on the sensor. Equation 5 also shows the relationship of $E_{(r)}$ to lens aperture a for a particular point r. Accordingly, the optimized intensity pattern of FIG. 5, for a particular radius R of disc 12, can be realized by adjusting the aperture of the lensing system.

When using the invention in a measuring system, the light field flattener 15, along with the discs 12 and 18 and the annular ring 22 are temporarily and coaxially coupled to the optical system 11, by any well-known technique, such as threading. The solid state sensor (not shown), is illuminated with light from a standard light through the light field flattener 15 and the lensing system 11. The individual pixels of the sensor are charged to various levels proportional to the intensity of light impacting the pixels. The charge levels on the individual pixels are digitized and provided to a memory device in known manner. The memory is then utilized to drive a viewing device, such as the CRT, so that the intensity pattern is visible on the CRT. The aperture of the optical system 11 is varied, while the intensity pattern is viewed on the CRT and the aperture is set for the optimum flatness of the intensity pattern, as illustrated by the pattern 32 of FIG. 5. The solid state sensor is then calibrated, using the optimized light field intensity pattern. The light field flattener 15 and the associated elements, are separated from the optical system 11 and the optical system is ready to make actual image measurements.

What is claimed is:

1. A device, including an optical system and a light field flattener, for providing a substantially flat light field, said light field flattener comprising:
   a first light transparent disc arranged to transmit light to said optical system, said light transparent disc having a light transparent polished edge, at least one polished surface and at least one other surface;
   an opaque layer coextensive with said polished surface whereby said opaque layer prevents light from passing directly through said light transparent disc to said optical system;
   a layer of reflective material arranged between said opaque layer and said polished surface;
   a second light transparent disc affixed to said polished surface and coaxial with said first disc, said second disc having a diameter greater than the diameter of said first disc whereby an overhang portion of said second disc overhangs said first disc; and
   a light reflective annular ring affixed to said at least one other surface of said first disc whereby light passes through said overhand portion and is reflected by said annular ring to said polished edge and is reflected to said optical system by said polished surface; the light passing through said first disc decreases in intensity as the distance, along said polished surface, from said edge increases.

2. The device of claim 1 further including a coating of reflective material on the surface of said annular ring which faces said overhang portion.

3. The device of claim 2 wherein said opaque means is an opaque layer affixed to said polished surface.

4. The device of claim 3 further including a layer of reflective material arranged between said opaque layer and said polished surface.

5. The device of claim 4 wherein said first and second discs and said optical system are coaxial.

6. The device of claim 5 wherein said optical system includes an adjustable aperture.

7. The device of claim 2 wherein said first and second discs and said optical system are coaxial.

8. The device of claim 7 wherein said first and second discs and said optical system are coaxial.

9. A light field flattener comprising:
   a first light transparent disc for transmitting light to an optical system, said light transparent disc having a polished light transparent edge, at least one polished surface and at least one other surface;
   opaque means coextensive with said light transparent disc whereby said opaque means prevents light from passing directly through said light transparent disc;
   a second light transparent disc affixed to said polished surface and coaxial with said first disc, said second disc having a diameter greater than the diameter of said first disc whereby an overhang portion of said second disc overhangs said first disc;
   a light reflective annular ring affixed to said one other surface of said first disc whereby light passes through said overhand portion and is reflected by said annular ring to said polished edge and is reflected to said optical system by said polished surface; and the light passing through said first disc decreases in intensity as the distance, along said polished surface, from said edge increases.

* * * * *